(12) United States Patent
Lee (10) Patent No.: US 8,573,847 B2
(45) Date of Patent: Nov. 5, 2013

(54) LINEAR MOTION GUIDE UNIT

(75) Inventor: Taek Won Lee, Seoul (KR)

(73) Assignee: Won ST Co., Ltd., Hwasung (KR)

( * ) Notice: Subject to any disclaimer, the term of this patent is extended or adjusted under 35 U.S.C. 154(b) by 70 days.

(21) Appl. No.: 13/332,550

(22) Filed: Dec. 21, 2011

(65) Prior Publication Data

US 2012/0163741 A1  Jun. 28, 2012

(30) Foreign Application Priority Data

Dec. 22, 2010  (KR) .................. 10-2010-0132686

(51) Int. Cl.
*B60N 2/07* (2006.01)
*F16C 19/00* (2006.01)

(52) U.S. Cl.
USPC .............................................. 384/47; 384/51

(58) Field of Classification Search
USPC .................. 384/47, 49–51, 54, 55, 57, 59
See application file for complete search history.

(56) References Cited

U.S. PATENT DOCUMENTS

| 5,427,454 | A  | * | 6/1995  | Tsuboi ............................ 384/47 |
| 6,692,151 | B2 | * | 2/2004  | Vegh et al. ..................... 384/51 |
| 6,736,541 | B2 | * | 5/2004  | Kamimura et al. ............. 384/47 |
| 6,886,983 | B2 | * | 5/2005  | Tsuboi et al. ................... 384/51 |
| 6,971,797 | B2 | * | 12/2005 | Obara et al. .................... 384/47 |
| 2007/0201778 | A1 | * | 8/2007 | Kakei ............................. 384/51 |

FOREIGN PATENT DOCUMENTS

KR  10-2002-0069116 A  8/2002

* cited by examiner

*Primary Examiner* — Phillip A Johnson
(74) *Attorney, Agent, or Firm* — LRK Patent Law Firm (57) ABSTRACT

A linear motion guide unit is provided, which is capable of preventing the variation in the position of a roller cage assembly caused by sliding motions of the roller cage assembly between a first guide rail and a second guide rail, without reducing the number of rollers. The linear motion guide unit includes first and second guide rails having track portions formed concavedly to have a V-shaped section on the faces opposing each other; and a roller cage assembly disposed between the first and second guide rails and having a plurality of rollers located between the first and second guide rails and ring-shaped pinions adapted to surround the rollers.

16 Claims, 10 Drawing Sheets

FIG. 1

RELATED ART

FIG. 2

RELATED ART

FIG. 3

RELATED ART

FIG. 4

RELATED ART

LINEAR MOTION GUIDE UNIT

CROSS REFERENCE TO RELATED APPLICATION

This application claims the benefit under 35 U.S.C. 119(a) of Korean Patent Application No. 10-2010-0132686, filed on Dec. 22, 2010, the disclosure of which is incorporated by reference in its entirety for all purposes.

BACKGROUND OF THE INVENTION

1. Field of the Invention

The present invention relates to a linear motion guide unit, and more particularly, to a linear motion guide unit that is capable of preventing the variation in the position of a roller cage assembly caused by sliding motions of the roller cage assembly between a first guide rail and a second guide rail, without reducing the number of rollers.

2. Background of the Related Art

Generally, a linear motion guide unit is used for machining tools each having a fixed body and a moving table linearly moved on the fixed body, and it includes a first guide rail fixed to one side of the fixed body or the moving table, a second guide rail fixed to the other side of the fixed body or the moving table, and a roller cage assembly disposed to be rolled between the first guide rail and the second guide rail so as to allow the relative linear motion between the first guide rail and the second guide rail to be gently carried out.

Figure 1:
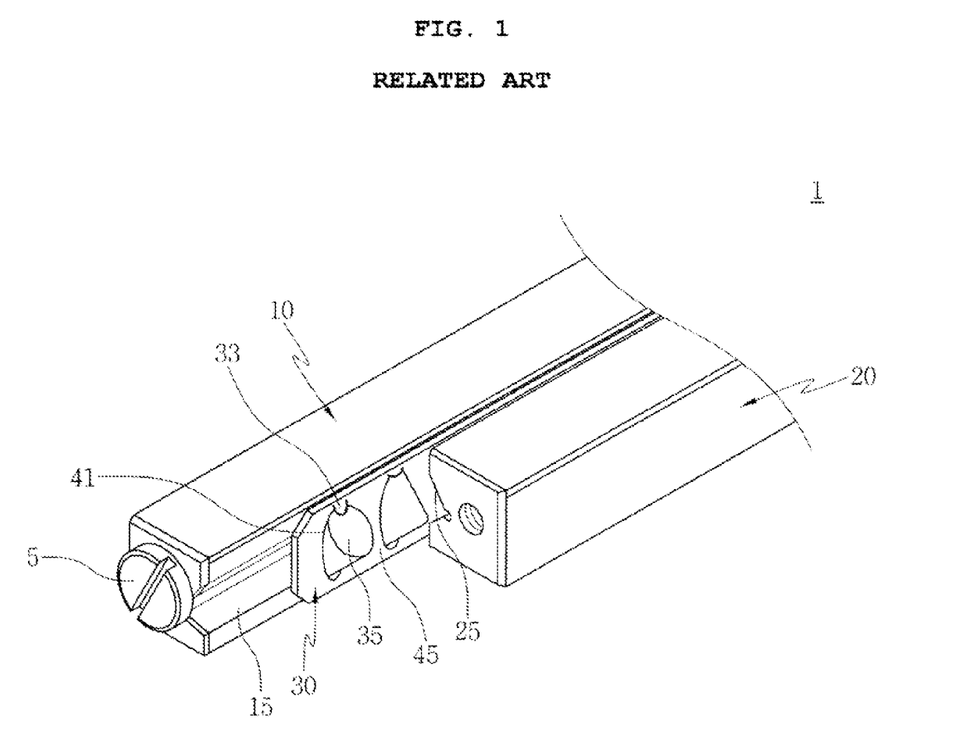
FIG. 1 is a perspective view showing a linear motion guide unit according to a conventional practice.
Figure 2:
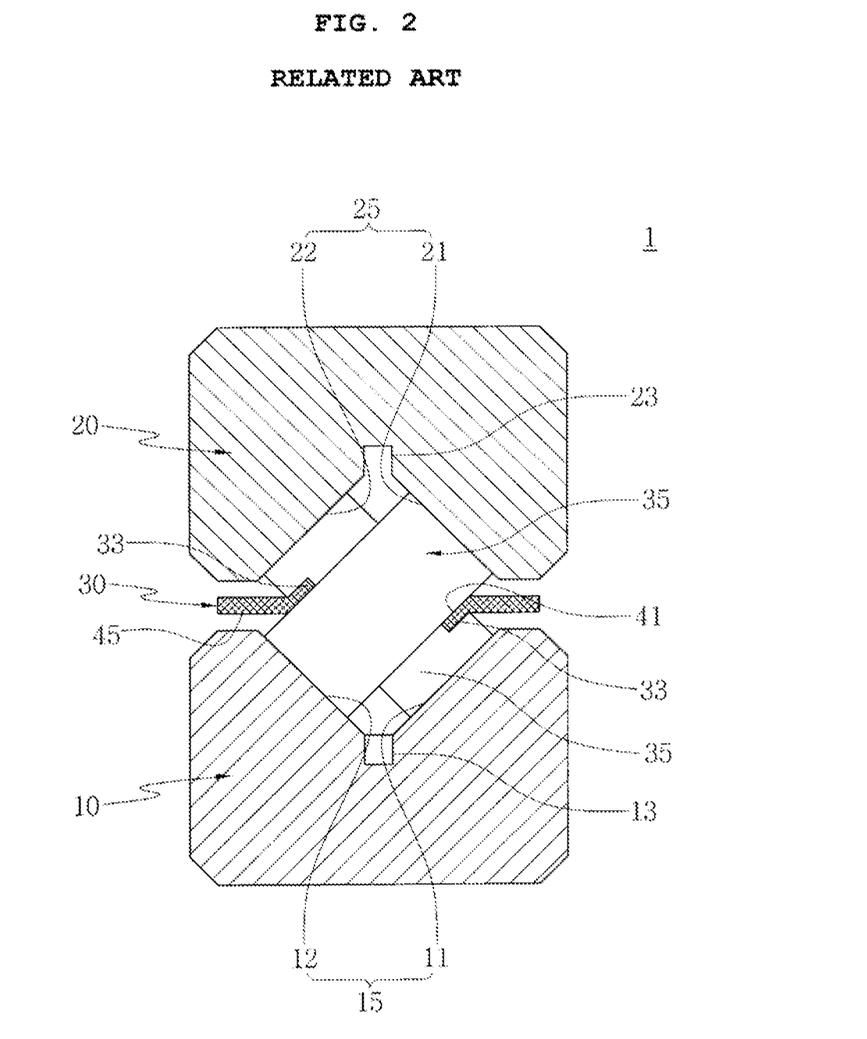
FIG. 2 is a sectional view showing the linear motion guide unit of FIG. 1.
Figure 3:
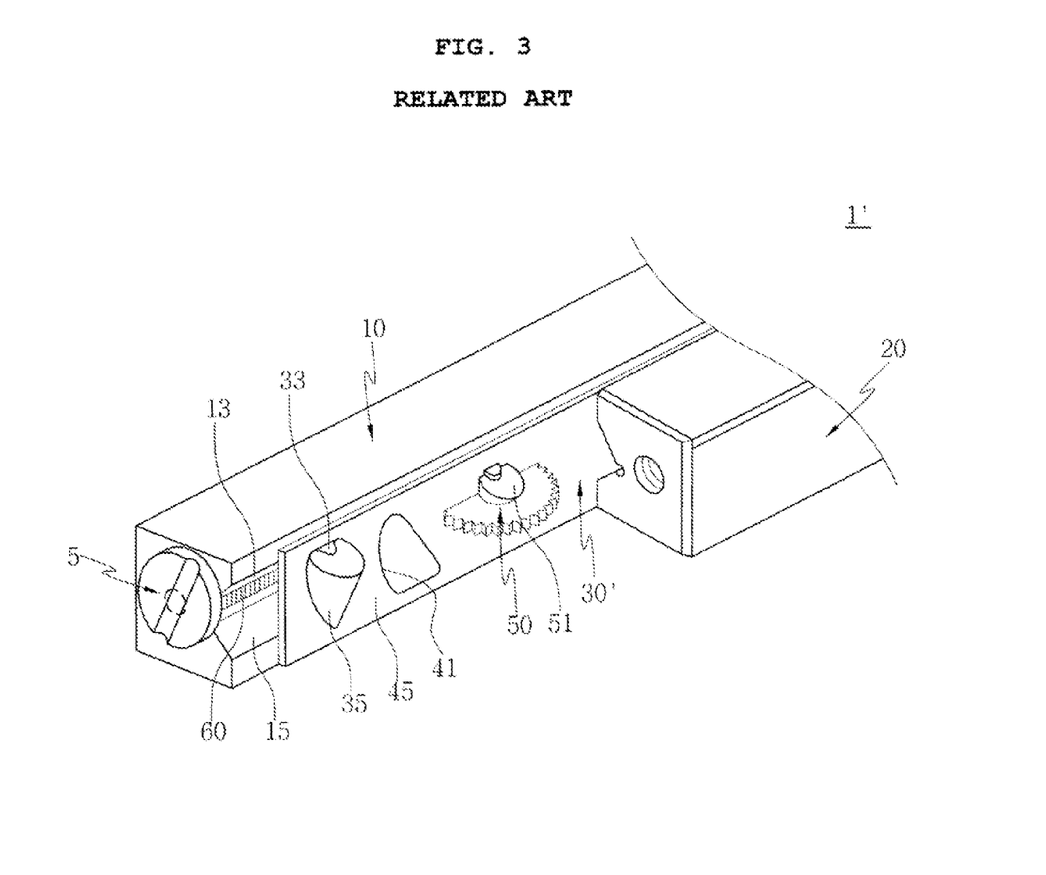
FIG. 3 is a perspective view showing a sliding prevention linear motion guide unit according to another conventional practice.
Figure 4:
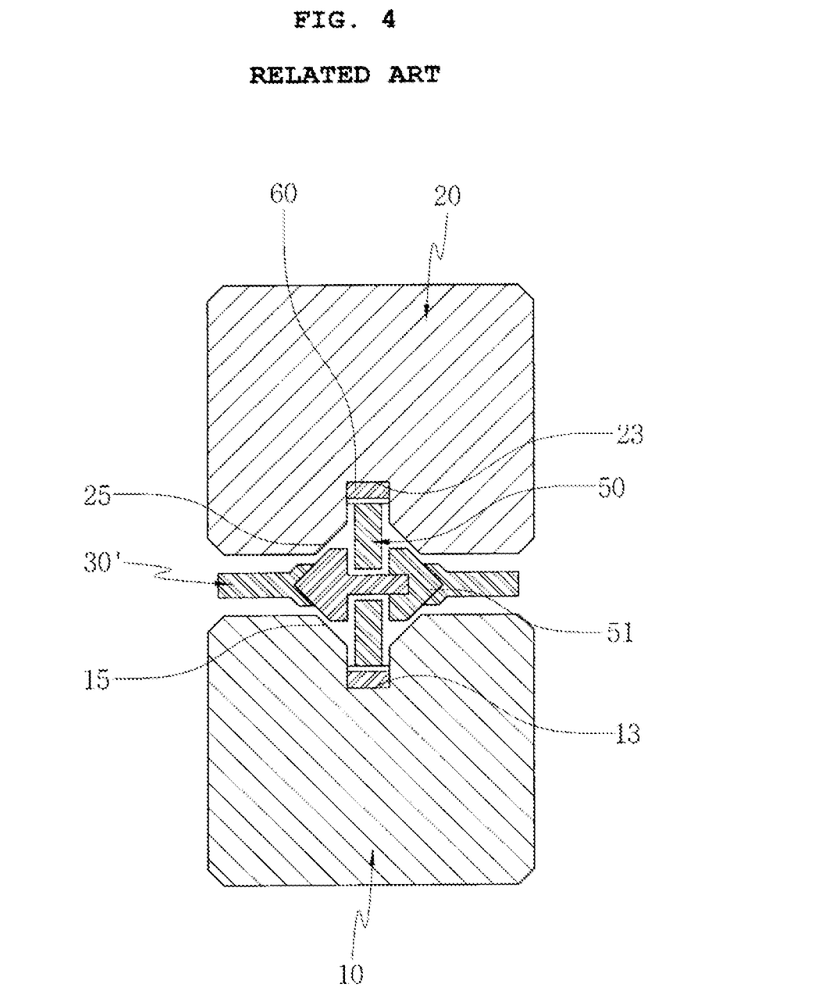
FIG. 4 is a sectional view showing the sliding prevention linear motion guide unit of FIG. 3.

FIG. 1 is a perspective view showing a linear motion guide unit according to a conventional practice, and FIG. 2 is a sectional view showing the linear motion guide unit of FIG. 1. Further, FIG. 3 is a perspective view showing a sliding prevention linear motion guide unit according to another conventional practice, and FIG. 4 is a sectional view showing the sliding prevention linear motion guide unit of FIG. 3.

In the description as will be explained below, a direction perpendicular to the ground in FIG. 2 becomes the direction of the length of the linear motion guide unit.

Generally, a linear motion guide unit 1 is a part installed in machining tools each having a fixed body (not shown) and a moving body (not shown) linearly moved on the fixed body so as to achieve relative linear motions in a gentle manner.

In more detail, the linear motion guide unit 1 includes a first guide rail 10 fixedly disposed on one side of the fixed body, a second guide rail 20 disposed on the moving table so as to perform a relative linear motion with respect to the first guide rail 10, and a roller cage assembly 30 disposed between the first guide rail and the second guide rail so as to perform a rolling motion therebetween.

The roller cage assembly 30 includes a plurality of rollers 35 and a cage plate 45 on which a plurality of roller installation openings 41 is formed to rotatably insert the plurality of rollers 35 thereinto. That is, the plurality of rollers 35 is rotatably inserted into the plurality of roller installation openings 41 formed to be spaced apart from one another by a given distance along the direction of the length of the cage plate 45, such that the plurality of rollers 35 are disposed spaced apart from one another by a given distance.

The first guide rail 10 has a track portion 15 having a pair of rolling faces 11 and 12 formed to have a V-shaped concaved section, and in the same manner as the first guide rail 10, the second guide rail 20 has a track portion 25 having a pair of rolling faces 21 and 22 formed to have a V-shaped concaved section. Further, the first guide rail 10 and the second guide rail 20 have track grooves 13 and 23 more concavedly formed than the pairs of rolling faces 11 and 12, and 21 and 22 in the direction of the length along the center of the track portions 15 and 25. At this time, the track portion 15 of the first guide rail 10 is disposed to be opposite to the track portion 25 of the second guide rail 20.

Moreover, the plurality of rollers 35 in the roller cage assembly 30 is disposed on the cage plate 45 in such a manner as to allow the rotary center lines of the adjacent rollers 35 to be repeatedly crossed to one another. Therefore, each roller 35 performs the rolling motion in the state of being brought into contact with the two facing rolling faces of the four rolling faces 11, 12, 21 and 22 forming the two track portions 15 and 25 facing each other.

In FIGS. 1 and 2, a reference numeral 5 denotes a deviation prevention screw 5 disposed on the end portion of the first guide rail 10 to restrict the rolling motion of the roller cage assembly 30, and 33 denotes a roller-grasping protrusion formed protrudedly on each of the plurality of roller installation openings 41 formed on the cage plate 45 so as to prevent the roller 35 rotatably inserted into each roller installation opening 41 from being deviated therefrom.

The roller cage assembly 30 is desirably movable to an appropriate position between the first guide rail 10 and the second guide rail 20 in correspondence with relative position variations between the first guide rail 10 and the second guide rail 20. In case of the linear motion guide unit 1 according to the conventional practice, however, if the roller cage assembly 30 performs a sliding motion between the track portions 15 and 25, that is, if a sliding motion, not a rolling motion, occurs between the plurality of rollers 35 and the rolling faces 11, 12, and 22 constituting the track portions 15 and 25, unfortunately, the roller cage assembly 30 may have relative position variations between the first guide rail 10 and the second guide rail 20.

If the first guide rail 10 and the second guide rail are used in the state of being disposed vertically with respect to a horizontal surface, especially, the above-mentioned problem may cause the roller cage assembly 30 to be slid and dropped between the first guide rail 10 and the second guide rail 20 by means of its own gravity, with a result that the roller cage assembly 30 is deviated from a given required position, thereby failing to perform its original function.

So as to solve the above-mentioned problems, there has been proposed the sliding prevention linear motion guide unit as shown in FIGS. 3 and 4.

The sliding prevention linear motion guide unit 1' according to the conventional practice includes a roller cage assembly 30' further having a rotary shaft 51 disposed parallel to a width direction of the case plate 45 and a pinion 50 mounted rotatably around the rotary shaft 51, a pair of racks 60 disposed inside the track grooves 13 and 23 of the first guide rail 10 and the second guide rail 20 in the direction of the length thereof in such a manner as to be engaged with the pinion 50 to prevent a sliding motion from occurring. In other words, the pinion 50 is positioned, while being engaged with the rack 60 disposed along the track groove 13 of the first guide rail 10 and at the same time with the rack 60 disposed along the track groove 23 of the second guide rail 20, such that the roller cage assembly 30' is moved in the state of being dependent upon the relative linear motion between the first guide rail 10 and the second guide rail 20. Accordingly, even in the case where a sliding motion occurs on the individual rollers 35, the roller cage assembly 30' can be located at an appropriate position corresponding to the relative position variation between the first guide rail 10 and the second guide rail 20.

In case of the sliding prevention linear motion guide unit 1', however, the pinion 50 is rotated around the rotary shaft 51 disposed parallel to the width direction of, the cage plate 45, as shown in FIG. 3, thereby occupying the space of the cage plate 45 on which the rollers 35 should be mounted, and therefore, if other conditions in the sliding prevention linear motion guide unit 1' are the same as in conventional linear motion guide units, the number of rollers 35 the roller cage assembly 30' has should be unavoidably reduced. The reduction of the number of rollers 35 in the same conditions undesirably causes the load supported by the roller cage assembly 30' to be decreased. For example, if a small-sized roller cage assembly 30' having two or three rollers 35 is made, one of the two or three rollers 35 should be removed to mount the pinion 50, which substantially increases the percentage of the decrease of the supportable load, thereby making it impossible to make the roller cage assembly 30' itself.

As mentioned above, the reduction of the load supported by the roller cage assembly 30' causes the linear motion between the first guide rail 10 and the second guide rail 20 to be not performed gently, causes the shortening of the life span, and in some cases, causes the normal rolling motion to be not performed at all. Therefore, this provides serious problems.

SUMMARY OF THE INVENTION

Accordingly, the present invention has been made in view of the above-mentioned problems occurring in the prior art, and it is an object of the present invention to provide a linear motion guide unit that is capable of preventing the variation in the position of a roller cage assembly caused by sliding motions of the roller cage assembly between a first guide rail and a second guide rail, without reducing the number of rollers in a size limited thereof.

To accomplish the above object, according to the present invention, there is provided a linear motion guide unit including: first and second guide rails having track portions formed concavedly to have a V-shaped section on the faces opposing each other; and a roller cage assembly disposed between the first and second guide rails and having a plurality of rollers located between the first and second guide rails and ring-shaped pinions adapted to surround the rollers.

According to the present invention, desirably, the rollers are provided plurally in number, and the ring-shaped pinions are provided one or more in number so as to surround one or more of the rollers.

According to the present invention, desirably, the roller cage assembly includes the plurality of rollers adapted to be located between the first and second guide rails, a cage plate disposed between the first and second guide rails and having a plurality of roller installation openings formed spaced apart from one another in the direction of the length thereof so as to rotatably insert the plurality of rollers thereinto, and the pinions rotatably disposed on the cage plate in such a manner as to be rotated in a direction parallel to the thickness direction thereof in a rotary center thereof, while being engaged at one side thereof in the width direction thereof with the first guide rail and engaged at the other side thereof with the second guide rail.

According to the present invention, desirably, the cage plate is formed by coupling cage plate members on which a plurality of roller installation holes constituting the plurality of roller installation openings are formed, any one or more of the cage plate members having pinion installation grooves formed concavedly to surround one or more of the roller installation holes in such a manner as to have an inside periphery surrounding the roller installation hole and have an outside periphery opened partially at both sides thereof, and each of the pinions is rotatably mounted in the pinion installation grooves in such a manner as to be protruded from both sides in a width direction thereof, such that one side of the protruded portions of each pinion is engaged with the first guide rail and the other side thereof is engaged with the second guide rail.

According to the present invention, desirably, each of the pinion has an inside periphery along which the inside peripheries of the pinion installation grooves are insertedly fitted and has a smaller outside periphery than the outside peripheries of the pinion installation grooves, such that the pinion is rotatably disposed between the inside peripheries of the pinion installation grooves and the outside peripheries thereof.

According to the present invention, desirably, each of the pinions includes a plurality of first teeth, and the first and second guide rails have a pair of rack members disposed parallel to each other in the direction of the length thereof, while placing the track portions therebetween and disposed at both sides of the roller cage assembly in the direction of the width thereof, the pair of rack members having a plurality of second teeth formed on the faces opposing each other in such a manner as to be engaged with the plurality of first teeth of the pinion.

According to the present invention, desirably, the first and second guide rails have rack installation grooves formed concavedly in the direction of the length thereof along one side faces opposing each other in the direction of the width of the track portions, each of the pair of rack members having a fixing portion adapted to be inserted into each of the rack installation grooves and an engagement portion disposed protrudedly from each of the rack installation grooves and having the plurality of second teeth formed on the face opposing to the other rack member in such a manner as to be engaged with the plurality of first teeth of the pinion, such that when the first guide rail and the second guide rail face each other, the engagement portions of the pair of rack members face each other.

According to the present invention, desirably, the rack installation grooves are connected to a plurality of fixing holes penetratedly extended therefrom in the direction of the width thereof in the opposite direction to the track portions in such a manner as to be spaced apart from one another in the direction of the length thereof, and each of the pair of rack members has elastic fixing protrusions formed protrudedly at one side of the fixing portion thereof on the positions corresponding to the plurality of fixing holes in the direction of the formation of the plurality of fixing holes in such a manner as to be inserted into the plurality of fixing holes.

According to the present invention, desirably, the fixing portion has elastic deformation portions formed at one side thereof in such a manner as to be inserted into each of the rack installation grooves together with the fixing portion, each of the elastic deformation portions having an inclined portion formed at the inside thereof in a widthwise direction thereof in such a manner as to be reduced in the thickness in the direction of the width thereof as it goes toward the end portions thereof, and the elastic fixing protrusions being protruded in the opposite direction to the inclined portions of the elastic deformation portions in such a manner as to be inserted into the plurality of fixing holes.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a linear motion guide unit according to the present invention will be in detail given with reference to the attached drawing.

Figure 5:
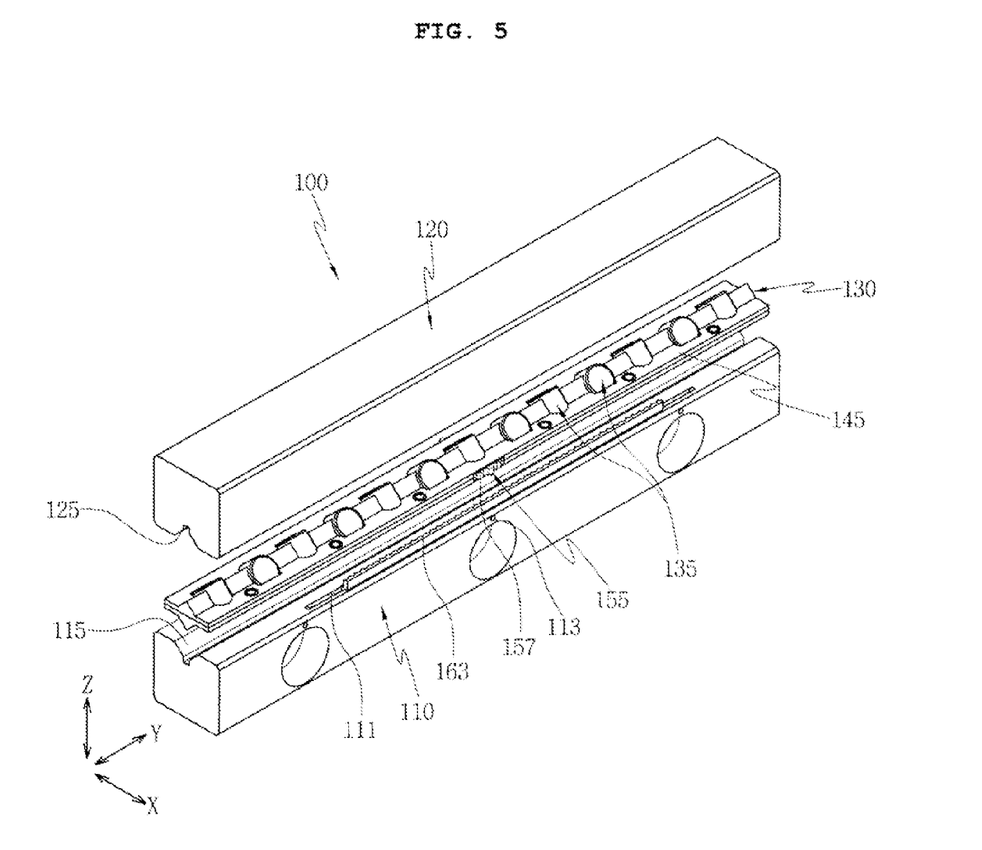
FIG. 5 is an exploded perspective view showing a linear motion guide unit according to the present invention.
Figure 6:
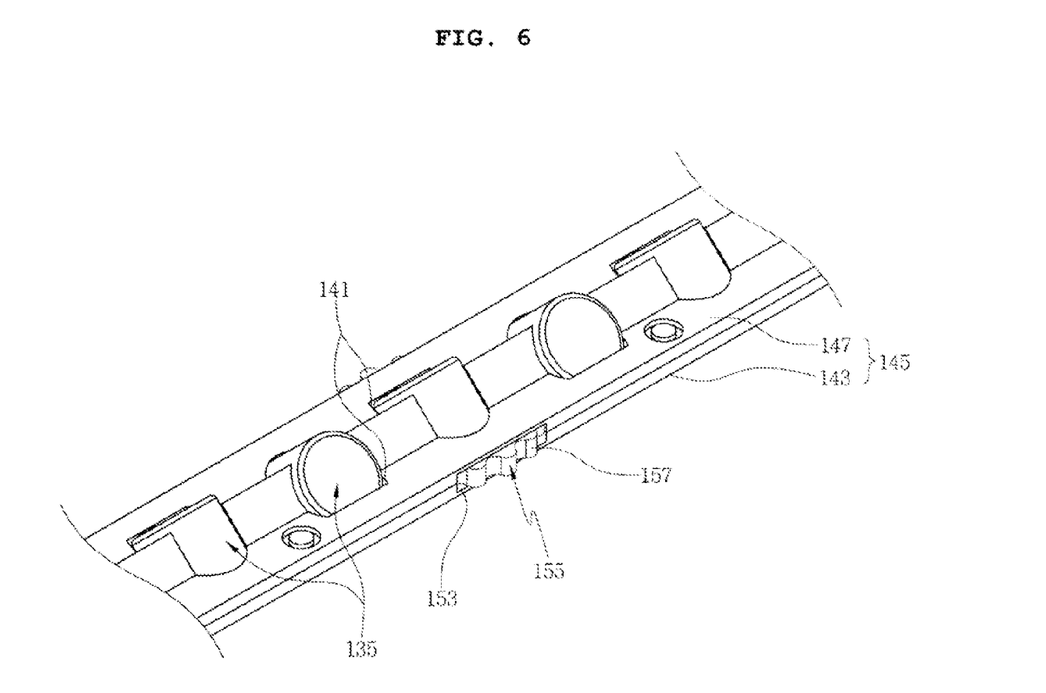
FIG. 6 is a partially enlarged perspective view showing a roller cage assembly of the linear motion guide unit according to the present invention.
Figure 7:
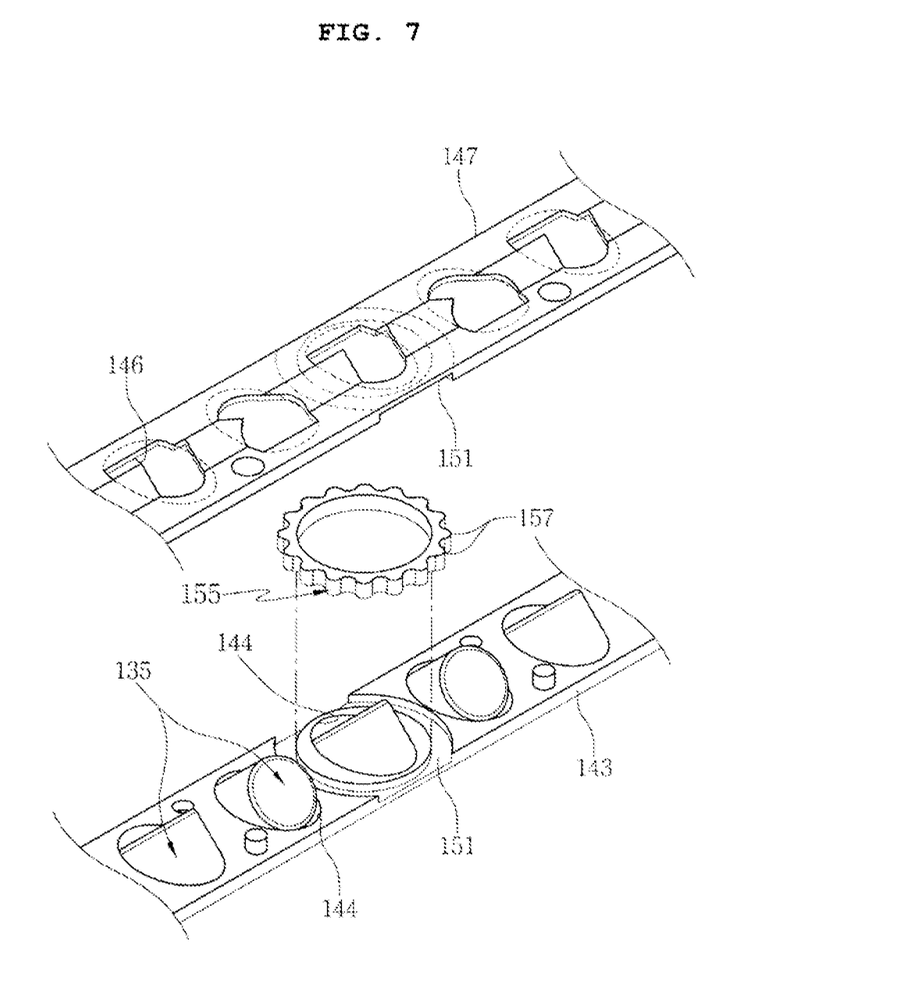
FIG. 7 is an exploded perspective view of FIG. 6.
Figure 8:
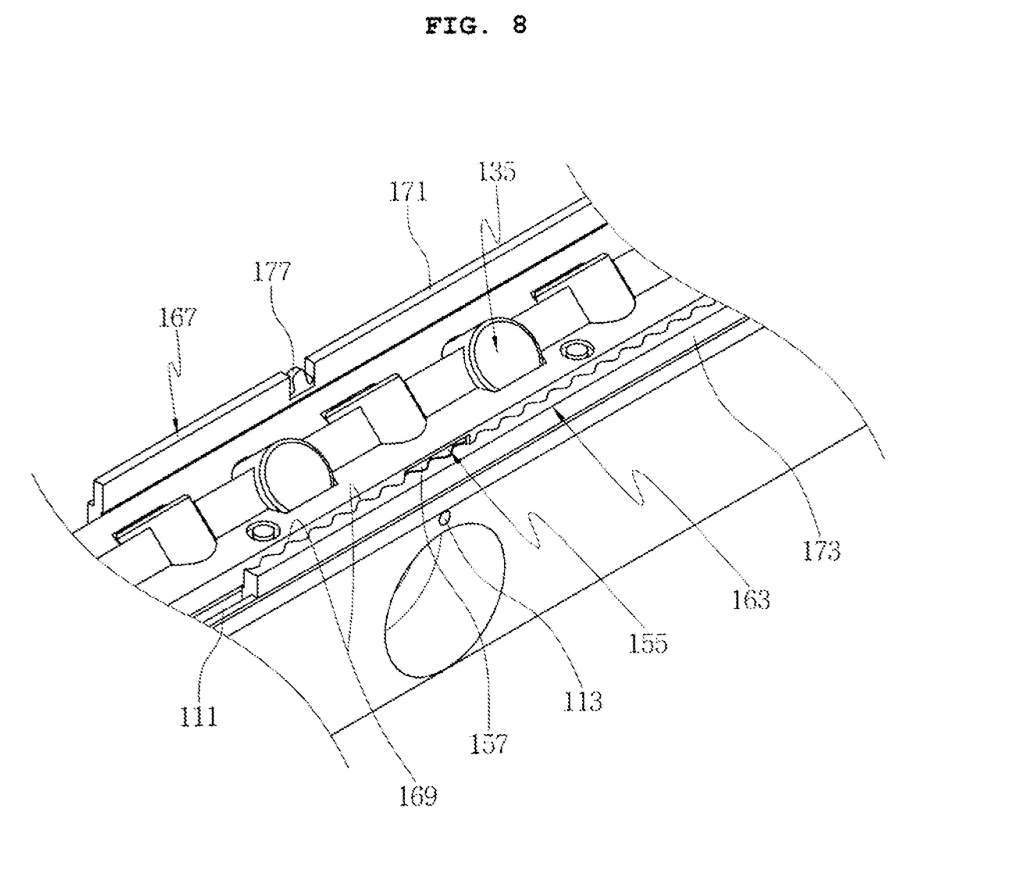
FIG. 8 is a perspective view showing the assembled state of the main parts of the linear motion guide unit according to the present invention.
Figure 9:
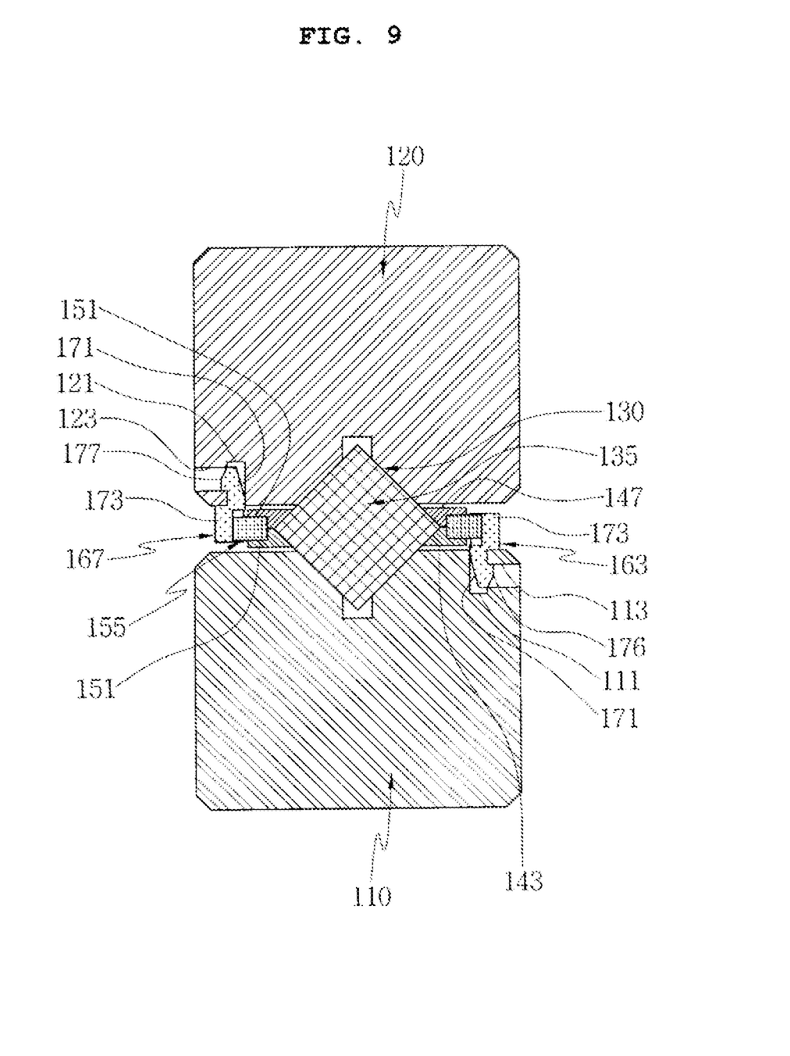
FIG. 9 is a sectional view showing the linear motion guide unit according to the present invention.

FIG. 5 is an exploded perspective view showing a linear motion guide unit according to the present invention, FIG. 6 is a partially enlarged perspective view showing a roller cage assembly of the linear motion guide unit according to the present invention, FIG. 7 is an exploded perspective view of FIG. 6, FIG. 8 is a perspective view showing the assembled state of the main parts of the linear motion guide unit according to the present invention, and FIG. 9 is a sectional view showing the linear motion guide unit according to the present invention.

For your reference, the present invention will be explained with the same terms for the same parts as the conventional practices, and in FIG. 5, a direction Y is defined as the direction of the length of the linear motion guide unit, a direction X the direction of the width thereof, and a direction Z the direction of the thickness thereof. The inside toward the direction of the width thereof is directed toward track portions as will be discussed later.

As shown in FIG. 5, a linear motion guide unit 100 according to the present invention includes first and second guide rails 110 and 120 facing each other, in a similar manner to the conventional practices, and a roller cage assembly 130.

The first guide rail 110 and the second guide rail 120 have track portions 115 and 125 formed concavely to have a V-shaped section on the faces opposing each other.

The roller cage assembly 130 has a plurality of rollers 135, a cage plate 145 and a pinion 155, as shown in FIGS. 5 to 7, and it is disposed between the first and second guide rails 110 and 120 in such a manner as to be parallel to the opposing faces of the first and second guide rails 110 and 120.

As shown in FIGS. 6 and 7, the cage plate 145 has a plurality of roller installation openings 141 formed spaced apart from one another in the direction of the length thereof so as to rotatably insert the plurality of rollers 135 thereinto.

The cage plate 145 is formed by coupling cage plate members 143 and 147 on which a plurality of roller installation holes 144 and 146 constituting the plurality of roller installation openings 141 are formed, and any one or more of the cage plate members 143 and 147 have pinion installation grooves 151 formed concavely to surround one or more of the roller installation holes 144 and 146 in such a manner as to have an inside periphery surrounding the one or more of the roller installation holes 144 and 146 and to have an outside periphery opened partially at both sides thereof. The pinion 155 is rotatably mounted in the pinion installation grooves 151 in such a manner as to be protruded from both sides thereof in the direction of the width thereof, such that one side of the protruded portions of the pinion 155 is engaged with the first guide rail 110 and the other side thereof is engaged with the second guide rail 120. One of the cage plate members 143 and 147 has a plurality of coupling holes formed at both sides in the direction of the width thereof along the direction of the length thereof, and the other thereof has a plurality of coupling protrusions formed at the positions corresponding to the plurality of coupling holes, such that the plurality of coupling protrusions are inserted into the plurality of coupling holes to couple the cage plate members 143 and 147 to each other. The plurality of coupling protrusions and the plurality of coupling holes are forcedly fitted to each other.

As shown in FIG. 7, the cage plate 145 is composed of the pair of cage plate members 143 and 147 having the plurality of roller installation holes 144 and 146 by which the plurality of roller installation openings 141 are formed when they are assembled to have a structure overlaid with each other. The cage plate members 143 and 147 have the ring-shaped pinion installation grooves 151 formed concavely to have an inside periphery in such a manner as to surround ones of the roller installation holes 144 and 146. The ring-shaped pinion installation grooves 151 are formed concavely to a given depth around the inside periphery thereof with which ones of the roller installation holes 144 and 146 abut, while being opened partially toward the sides from both ends in the direction of the width thereof. Accordingly, when the pair of cage plate members 143 and 147 are assembled to have the structure overlaid with each other, a ring-shaped pinion installation space portion is formed inside the cage plate 145, and in this case, the pinion installation space portion has a pair of openings 153 formed at both ends in the direction of the width thereof in such a manner as to be opened toward both sides in the direction of the width thereof.

Moreover, the pinion 155 is disposed parallel to the cage plate 145 such that one side thereof with respect to the direction of the width of the cage plate 145 is engaged with the first guide rail 110 and the other side thereof is engaged with the second guide rail 120. At this state, when a relative linear motion between the first guide rail 110 and the second guide rail 120 is performed, the pinion 155 is rotated around the rotary center formed parallel to the direction of the thickness of the cage plate 145.

In more detail, as shown in FIGS. 6 and 7, the pinion 155 is ring-shaped and is located into the pinion installation space portion formed inside the cage plate 145. When the cage plate members 143 and 147 are coupled to each other, the pinion 155 is protruded outwardly from the pair of openings 153 formed at both sides in the direction of the width of the cage plate 145 in such a manner as to be partially exposed to the outside toward both sides in the direction of the width thereof. According to the present invention, the pinion 155 has the shape of the ring having a plurality of teeth 157 formed along the outer periphery surface thereof. The plurality of teeth 157 is engaged with a pair of rack members 163, as will be discussed later, so as to prevent sliding, which is of course formed a variety of shapes.

At this time, the pinion 155 has an inside periphery corresponding to the inside periphery of the pinion installation space portion formed by overlaying the two pinion installation grooves 151 with each other in such a manner as to insert the inside periphery of the pinion installation space portion into the inside periphery thereof, and also, the pinion 155 has a maximum outside periphery smaller than the outside periphery of the pinion installation space portion. Thus, the pinion 155 is supportedly rotated by means of the inside periphery of the pinion installation space portion in the state of being loosely fitted thereto, without having any interference with the outer periphery of the pinion installation space portion. Furthermore, the pinion 155 has the plurality of teeth 157 formed along the outer periphery thereof.

As shown in FIGS. 8 and 9, the linear motion guide unit 100 according to the present invention further includes the pair of rack members 163 disposed correspondingly on the first guide rail 110 and the second guide rail 120 in such a manner as to be engaged with the pinion 155 to allow the roller cage assembly 130 to be operated cooperatively with the first guide rail 110 and the second guide rail 120.

As shown in FIG. 9, the pair of rack members 163 is disposed correspondingly at both sides in the direction of the width of the roller cage assembly 130 in such a manner as to be protruded parallel to the direction of the length thereof at one sides of the track portions 115 and 125 provided on the first and second guide rails 110 and 120. If the track portions 115 and 125 face each other, the rack members 163 provided on the first and second guide rails 110 and 120 have engagement portions 173 facing each other.

Each of the pair of rack members 163 has a plurality of teeth 169 formed toward the pinion 155 in such a manner as to be engaged with the pinion 155 protruded from both sides in the direction of the width thereof through the openings 153 of the cage plate 145.

As shown in FIG. 8, each of the pair of rack members 163 has a fixing portion 171 adapted to be inserted into each of rack installation grooves 111 and 121 formed concavedly on the opposing faces of one sides of the track portions 115 and 125 of the first and second guide rails 110 and 120 in the direction of the length thereof and the engagement portion 173 protruded outwardly and having the plurality of teeth 169 formed on the face opposing to the pinion 155 in such a manner as to be engaged with the plurality of teeth 157 of the pinion 155.

The rack installation grooves 111 and 121 are connected to a plurality of fixing holes 113 and 123 penetrated perpendicularly at the sides of the first guide rail 110 and the second guide rail 120. The plurality of fixing holes 113 and 123 are formed at the outside in the width direction from the rack installation grooves 111 and 121.

Furthermore, the pair of rack members 163 has elastic fixing protrusions 177 protruded toward the plurality of fixing holes 113 and 123 at the positions corresponding to the plurality of fixing holes 113 and 123 in such a manner as to be inserted into the rack installation grooves 111 and 121 and at the same time into the plurality of fixing holes 113 and 123. If the elastic fixing protrusions 177 are inserted into the plurality of fixing holes 113 and 123, the deviation of the rack members 163 from the rack installation grooves 111 and 121 is prevented.

Figure 10:
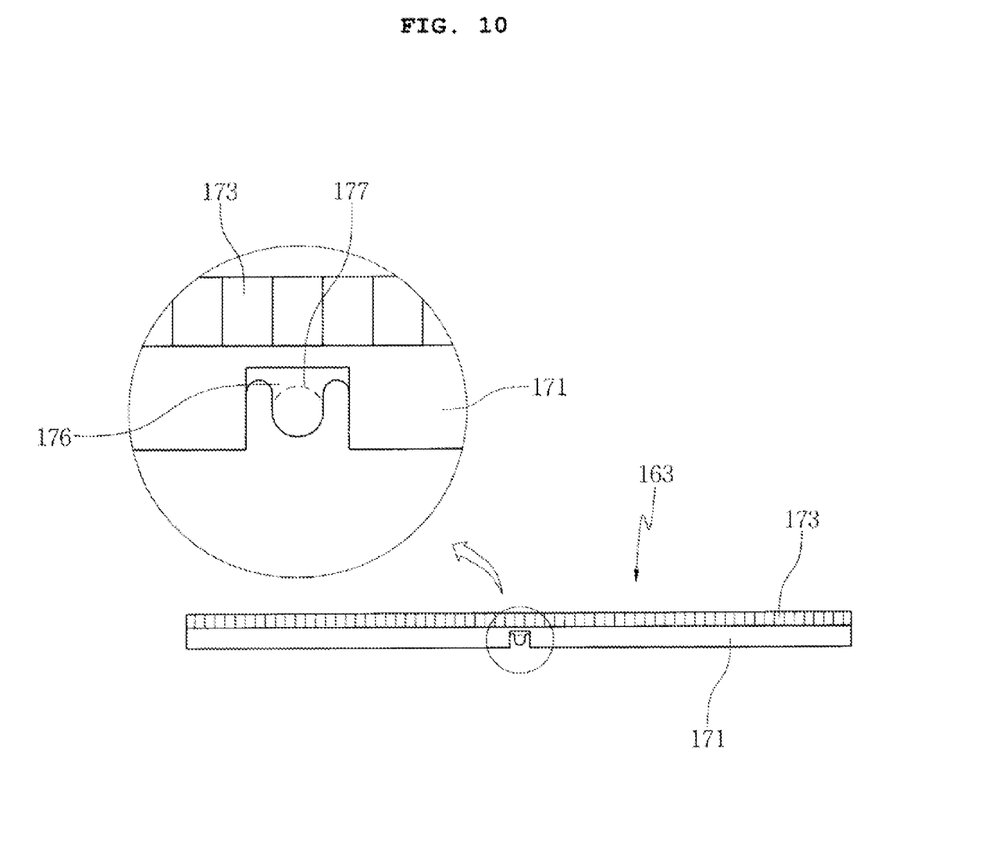
FIG. 10 is a partially enlarged perspective view showing one rack member of the linear motion guide unit according to the present invention.

As shown in FIG. 10, the fixing portion 171 has elastic deformation portions 176 formed at one side thereof in such a manner as to be inserted into the rack installation grooves 111 and 121 together with the fixing portion 171, and each of the elastic deformation portions 176 has an inclined portion formed at the inside thereof in the direction of the width thereof in such a manner as to be reduced in the thickness in the direction of the width thereof as it goes toward the end portions thereof. The elastic fixing protrusions 177 are protruded in the opposite direction to the inclined portions of the elastic deformation portions 176 in such a manner as to be inserted into the plurality of fixing holes 113 and 123. The elastic deformation portions 176 are formed along the fixing portion 171.

At this time, the fixing holes 113 and 123 connected to the rack installation grooves 111 and 121 are provided plurally in number, and therefore, the elastic fixing protrusions 177 formed on each rack member 163 are provided plurally in number.

The rack members 163 may be fixedly disposed by bonding the fixing portions 171 to the rack installation grooves 111 and 121 by means of an adhesive, without having any elastic fixing protrusions 177 and elastic deformation portions 176 formed thereon and without having any fixing holes 113 and 123 formed on the first guide rail 110 and the second guide rail 120 in such a manner as to be connected to the rack installation grooves 111 and 121.

As shown in FIGS. 6 and 7, the roller cage assembly 130 of the linear motion guide unit 100 according to the present invention is assembled by first disposing the plurality of rollers 135 on the roller installation holes 144 of one cage plate member 143, disposing the pinion 155 into one pinion installation groove 151, and overlaying the other cage plate member 147 on one cage plate member 143. Furthermore, as shown in FIGS. 8 and 9, the roller cage assembly 130 is disposed between the first guide rail 110 and the second guide rail 120 to which the rack members 163 are coupled in such a manner as to allow the pinion 155 protruded from both sides in the direction of the width of the cage plate 145 through the openings 153 and the pair of rack members 163 to be engaged with each other by means of their respective teeth 157 and 169, thereby making the linear motion guide unit 100 according to the present invention.

Therefore, the roller cage assembly 130 is moved between the first guide rail 110 and the second guide rail 120 in accordance with the relative linear motion between the first guide rail 110 and the second guide rail 120, and it is always located accurately at an expected position in accordance with the relative position between the first guide rail 110 and the second guide rail 120.

According to the present invention, as shown in FIGS. 6 and 7, the pinion installation grooves 151 forming the pinion installation space portion are formed to surround ones of the plurality of roller installation holes 144 and 146 formed on the cage plate members 143 and 147. Therefore, the roller installation holes 144 and 146 to which the rollers 135 are insertedly fitted are formed at the inside of the pinion installation grooves 151. Next, the pinion 155 is disposed into the pinion installation grooves 151, and the rollers 135 are insertedly fitted to the roller installation holes 144 and 146. Even in this case, the pinion 155 and the roller 135 disposed adjacent to the pinion 155 are independently moved, without any interference with each other. That is, the pinion 155 is rotatable supportedly by means of the inner periphery of the pinion installation space, and also, the pinion 155 does not occupy the space in which the roller 135 is disposed, such that unlike the conventional practices, there is no need for reducing the number of rollers when the roller cage assembly is made in a limited size.

According to the present invention, moreover, the rack members 163 of the linear motion guide unit 100 are not disposed at the positions where the assembly work is difficult like the track grooves 13 and 23 formed to a narrow and deep shape along the center of the track portions 15 and 25 of the first and second guide rails 10 and 20 in the conventional practices, but they are disposed easily along the rack installation grooves 111 and 121 at the sides of the track portions 115 and 125 exposed to the outside. Furthermore, the rack members 163 have the installation positions determined automatically through the coupling between the elastic fixing protrusions 177 and the fixing holes 113 and 123, thereby performing the positioning and assembly work in an easy manner.

As described above, there is provided the linear motion guide unit according to the present invention that does not need to reduce the number of rollers in the same conditions, thereby preventing supportable load from being reduced, and that effectively prevents the variation in the position of the roller cage assembly caused by sliding motions of the roller cage assembly between the first guide rail and the second guide rail, while providing gentle load support and smooth linear motion guide.

Additionally, the present invention is capable of performing the positioning and assembly work of the rack members adapted to be engaged with the pinion in an easy manner.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A linear motion guide unit comprising:
   first and second guide rails having track portions formed concavedly to have a V-shaped section on the faces opposing each other; and
   a roller cage assembly disposed between the first and second guide rails and having a plurality of rollers located between the first and second guide rails and at least one pinion having a ring shape, each pinion configured to surround one of the rollers.

2. The linear motion guide unit according to claim 1, wherein the rollers are provided plurally in number, and the pinions are provided one or more in number so as to surround one or more of the rollers.

3. The linear motion guide unit according to claim 2, wherein the roller cage assembly includes a cage plate disposed between the first and second guide rails and having a plurality of roller installation openings formed spaced apart from one another in the direction of the length thereof so as to rotatably insert the plurality of rollers thereinto, the plurality of rollers adapted to be rotatably inserted into the plurality of roller installation openings, and the pinions rotatably disposed on the cage plate in such a manner as to be rotated in a direction parallel to the thickness direction thereof in a rotary center thereof, while being engaged at one side thereof in the width direction thereof with the first guide rail and engaged at the other side thereof with the second guide rail.

4. The linear motion guide unit according to claim 1, wherein the roller cage assembly includes a cage plate disposed between the first and second guide rails and having a plurality of roller installation openings formed spaced apart from one another in the direction of the length thereof so as to rotatably insert the plurality of rollers thereinto, the plurality of rollers adapted to be rotatably inserted into the plurality of roller installation openings, and the pinions rotatably disposed on the cage plate in such a manner as to be rotated in a direction parallel to the thickness direction thereof in a rotary center thereof, while being engaged at one side thereof in the width direction thereof with the first guide rail and engaged at the other side thereof with the second guide rail.

5. A linear motion guide unit comprising:
   first and second guide rails having track portions formed concavedly to have a V-shaped section on the faces opposing each other; and
   a roller cage assembly disposed between the first and second guide rails and having a plurality of rollers located between the first and second guide rails and pinions adapted to surround the rollers,
   wherein the roller cage assembly includes a cage plate disposed between the first and second guide rails and having a plurality of roller installation openings formed spaced apart from one another in the direction of the length thereof so as to rotatably insert the plurality of rollers thereinto, the plurality of rollers adapted to be rotatably inserted into the plurality of roller installation openings, and the pinions rotatably disposed on the cage plate in such a manner as to be rotated in a direction parallel to the thickness direction thereof in a rotary center thereof, while being engaged at one side thereof in the width direction thereof with the first guide rail and engaged at the other side thereof with the second guide rail, and
   wherein the cage plate is formed by coupling cage plate members on which a plurality of roller installation holes constituting the plurality of roller installation openings are formed, any one or more of the cage plate members having pinion installation grooves formed concavedly to surround one or more of the roller installation holes in such a manner as to have an inside periphery surrounding the roller installation hole and have an outside periphery opened partially at both sides thereof, and each of the pinions is rotatably mounted in the pinion installation grooves in such a manner as to be protruded from both sides in a width direction thereof, such that one side of the protruded portions of each pinion is engaged with the first guide rail and the other side thereof is engaged with the second guide rail.

6. The linear motion guide unit according to claim 5, wherein each of the pinions has an inside periphery along which the inside peripheries of the pinion installation grooves are insertedly fitted and has a smaller outside periphery than the outside peripheries of the pinion installation grooves, such that the pinion is rotatably disposed between the inside peripheries of the pinion installation grooves and the outside peripheries thereof.

7. The linear motion guide unit according to claim 6, wherein each of the pinions includes a plurality of first teeth, and the first and second guide rails have a pair of rack members disposed parallel to each other in a lengthwise direction thereof, while placing the track portions therebetween and disposed at both sides of the roller cage assembly in the direction of the width thereof, the pair of rack members having a plurality of second teeth formed on the faces opposing each other in such a manner as to be engaged with the plurality of first teeth of the pinion.

8. The linear motion guide unit according to claim 7, wherein the first and second guide rails have rack installation grooves formed concavedly in the direction of the length thereof along side faces opposing each other in the direction of the width of the track portions, each of the pair of rack members having a fixing portion adapted to be inserted into each of the rack installation grooves and an engagement portion disposed protrudedly from each of the rack installation grooves and having the plurality of second teeth formed on the face opposing to the other rack member in such a manner as to be engaged with the plurality of first teeth of the pinion, such that when the first guide rail and the second guide rail face each other, the engagement portions of the pair of rack members face each other.

9. The linear motion guide unit according to claim 8, wherein the rack installation grooves are connected to a plurality of fixing holes penetratedly extended therefrom in the direction of the width thereof in the opposite direction to the track portions in such a manner as to be spaced apart from one another in the direction of the length thereof, and each of the pair of rack members has elastic fixing protrusions formed protrudedly at one side of the fixing portion thereof on the positions corresponding to the plurality of fixing holes in the direction of the formation of the plurality of fixing holes in such a manner as to be inserted into the plurality of fixing holes.

10. The linear motion guide unit according to claim 9, wherein the fixing portion has elastic deformation portions formed at one side thereof in such a manner as to be inserted into each of the rack installation grooves together with the fixing portion, each of the elastic deformation portions having an inclined portion formed at the inside thereof in a widthwise direction thereof in such a manner as to be reduced in thickness in the direction of the width getting closer to the end portions thereof, and the elastic fixing protrusions being protruded in the opposite direction to the inclined portions of the elastic deformation portions in such a manner as to be inserted into the plurality of fixing holes.

11. A linear motion guide unit comprising:
first and second guide rails having track portions formed concavedly to have a V-shaped section on the faces opposing each other; and
a roller cage assembly disposed between the first and second guide rails and having a plurality of rollers located between the first and second guide rails and pinions adapted to surround the rollers,
wherein the rollers are provided plurality in number, and the pinions are provided one or more in number so as to surround one or more of the rollers,
wherein the roller cage assembly includes a cage plate disposed between the first and second guide rails and having a plurality of roller installation openings formed spaced apart from one another in the direction of the length thereof so as to rotatably insert the plurality of rollers thereinto, the plurality of rollers adapted to be rotatably inserted into the plurality of roller installation openings, and the pinions rotatably disposed on the cage plate in such a manner as to be rotated in a direction parallel to the thickness direction thereof in a rotary center thereof, while being engaged at one side thereof in the width direction thereof with the first guide rail and engaged at the other side thereof with the second guide rail, and
wherein the cage plate is formed by coupling cage plate members on which a plurality of roller installation holes constituting the plurality of roller installation openings are formed, any one or more of the cage plate members having pinion installation grooves formed concavedly to surround one or more of the roller installation holes in such a manner as to have an inside periphery surrounding the roller installation hole and have an outside periphery opened partially at both sides thereof, and each of the pinions is rotatably mounted in the pinion installation grooves in such a manner as to be protruded from both sides in a width direction thereof, such that one side of the protruded portions of each pinion is engaged with the first guide rail and the other side thereof is engaged with the second guide rail.

12. The linear motion guide unit according to claim 11, wherein each of the pinions has an inside periphery along which the inside peripheries of the pinion installation grooves are insertedly fitted and has a smaller outside periphery than the outside peripheries of the pinion installation grooves, such that the pinion is rotatably disposed between the inside peripheries of the pinion installation grooves and the outside peripheries thereof.

13. The linear motion guide unit according to claim 12, wherein each of the pinions includes a plurality of first teeth, and the first and second guide rails have a pair of rack members disposed parallel to each other in a lengthwise direction thereof, while placing the track portions therebetween and disposed at both sides of the roller cage assembly in the direction of the width thereof, the pair of rack members having a plurality of second teeth formed on the faces opposing each other in such a manner as to be engaged with the plurality of first teeth of the pinion.

14. The linear motion guide unit according to claim 13, wherein the first and second guide rails have rack installation grooves formed concavedly in the direction of the length thereof along side faces opposing each other in the direction of the width of the track portions, each of the pair of rack members having a fixing portion adapted to be inserted into each of the rack installation grooves and an engagement portion disposed protrudedly from each of the rack installation grooves and having the plurality of second teeth formed on the face opposing to the other rack member in such a manner as to be engaged with the plurality of first teeth of the pinion, such that when the first guide rail and the second guide rail face each other, the engagement portions of the pair of rack members face each other.

15. The linear motion guide unit according to claim 14, wherein the rack installation grooves are connected to a plurality of fixing holes penetratedly extended therefrom in the direction of the width thereof in the opposite direction to the track portions in such a manner as to be spaced apart from one another in the direction of the length thereof, and each of the pair of rack members has elastic fixing protrusions formed protrudedly at one side of the fixing portion thereof on the positions corresponding to the plurality of fixing holes in the direction of the formation of the plurality of fixing holes in such a manner as to be inserted into the plurality of fixing holes.

16. The linear motion guide unit according to claim 15, wherein the fixing portion has elastic deformation portions formed at one side thereof in such a manner as to be inserted into each of the rack installation grooves together with the fixing portion, each of the elastic deformation portions having an inclined portion formed at the inside thereof in a widthwise direction thereof in such a manner as to be reduced in thickness in the direction of the width getting closer to the end portions thereof, and the elastic fixing protrusions being protruded in the opposite direction to the inclined portions of the elastic deformation portions in such a manner as to be inserted into the plurality of fixing holes.

* * * * *